G. R. VAN AUKEN.
WING OPERATING MECHANISM.
APPLICATION FILED APR. 1, 1918.

1,284,825.

Patented Nov. 12, 1918.
3 SHEETS—SHEET 1.

Inventor
George R. Van Auken
By Lancaster and Allwine
his Attorneys

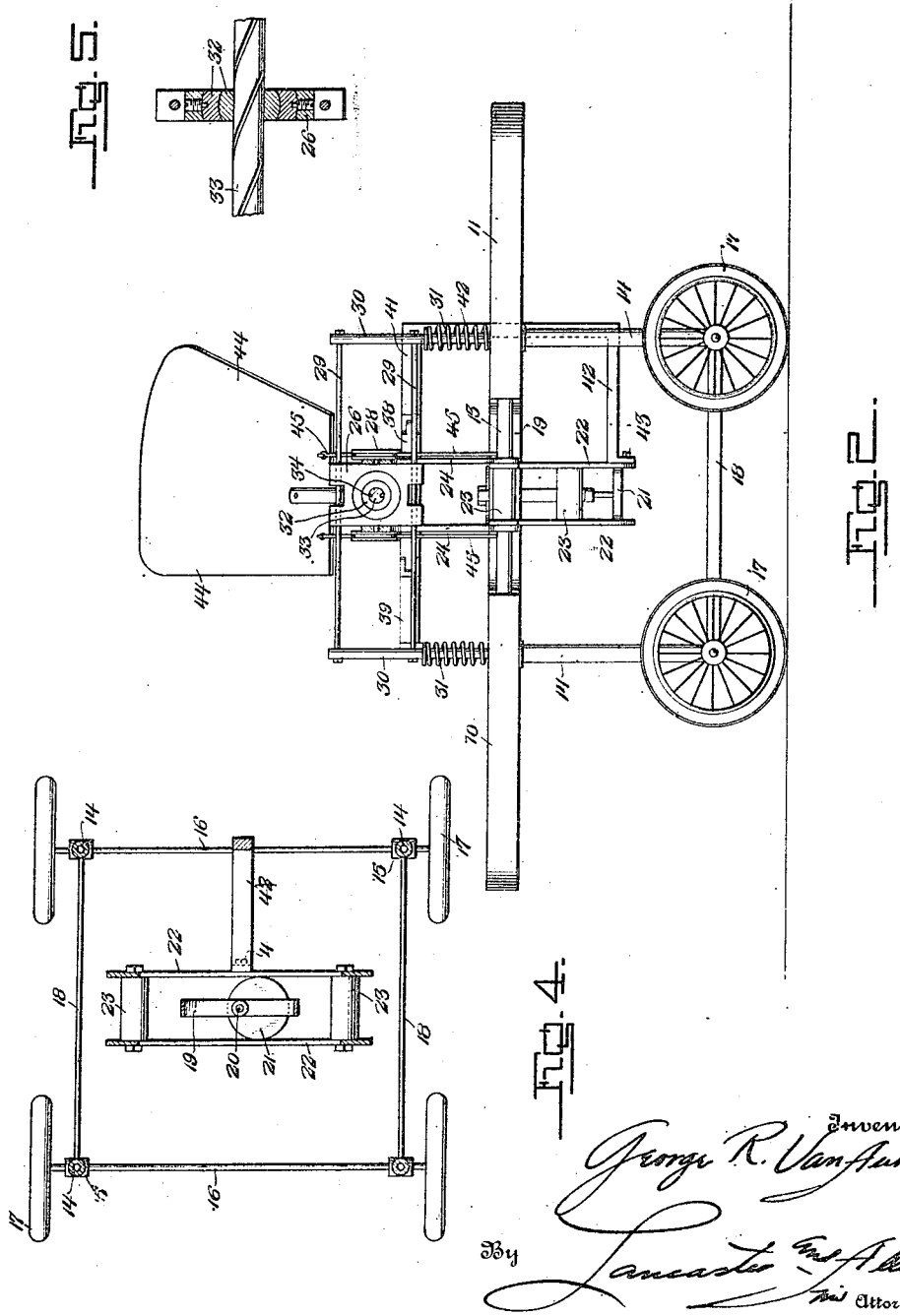

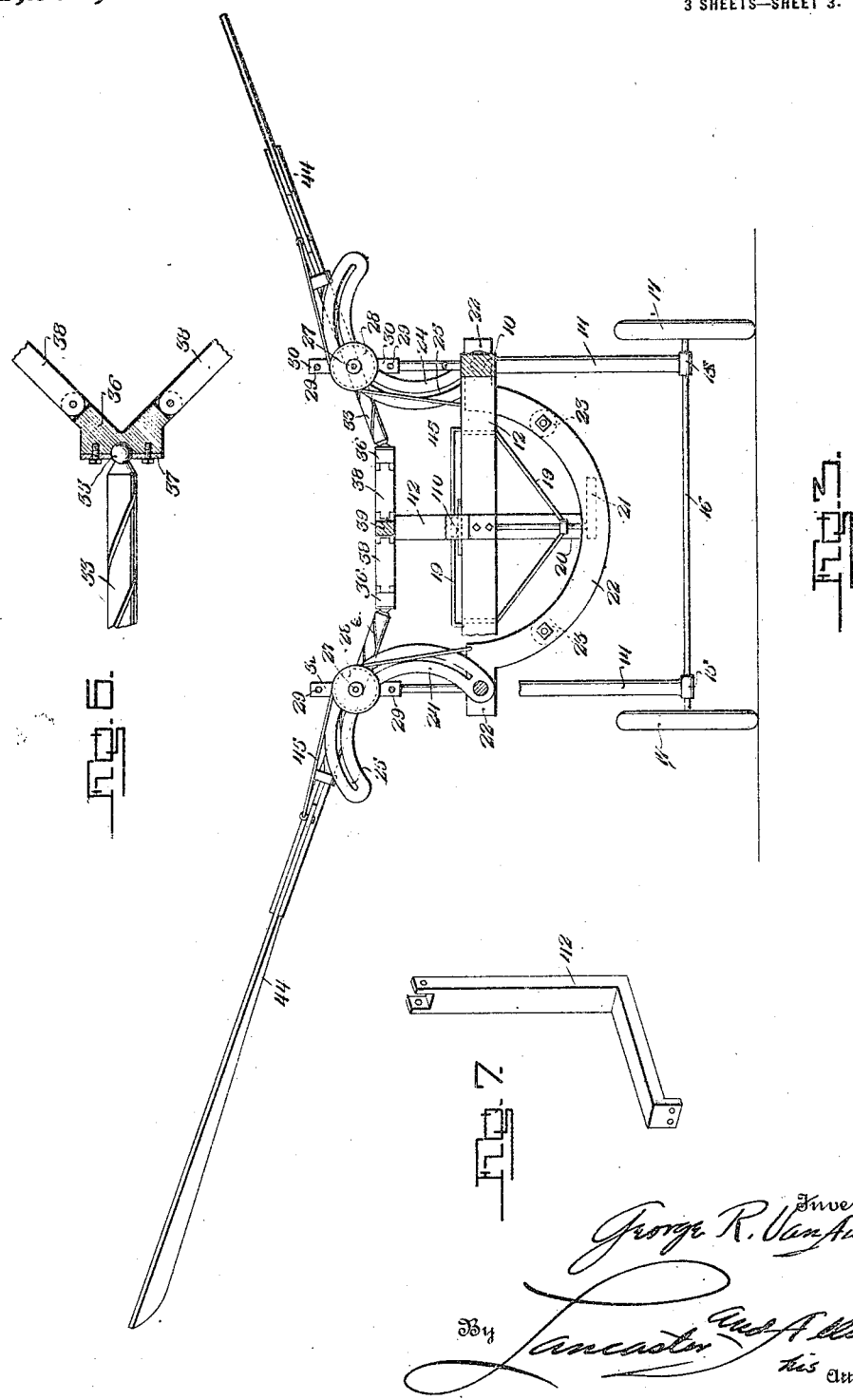

UNITED STATES PATENT OFFICE.

GEORGE R. VAN AUKEN, OF MINNEAPOLIS, MINNESOTA.

WING-OPERATING MECHANISM.

1,284,825. Specification of Letters Patent. Patented Nov. 12, 1918.

Application filed April 1, 1918. Serial No. 226,021.

*To all whom it may concern:*

Be it known that I, GEORGE R. VAN AUKEN, a citizen of the United States, and a resident of Minneapolis, in the county of Hennepin and State of Minnesota, have invented a certain new and useful Improvement in a Wing-Operating Mechanism, of which the following is a specification.

The present invention relates to a mechanism for operating wings, particularly adapted for use in flying machines and like devices.

An object of the present invention is to provide a relatively simple, light and compact mechanism which is adapted not only to impart a rotary movement to a pair of wings, but to also swing the wings about a horizontal axis and reciprocate the revolving and swinging wings longitudinally of the device.

Another object of the present invention is to provide an apparatus or mechanism of this character which may be operated from a single motor of relatively low horse power and driven at a normal speed; to provide a device with cushioning means for supporting the spring for absorbing shock against abnormal air pressure without injury to the wings; and to provide a mechanism of this character which embodies but few movable parts so arranged that a strong and durable structure may be made.

The above, and various objects and advantages of this invention will be in part described, and in part understood, from the following detailed description of the present preferred embodiment, the same illustrated in the accompanying drawings, wherein—

Fig. 2 is a side elevation of the same.

Fig. 3 is a transverse section taken through one end of the device.

Fig. 4 is a horizontal section through the lower portion of the device showing the running or landing gear thereof.

Fig. 5 is a fragmentary enlarged section through one of the bearings for one of the screw shafts which carries the adjacent wing.

Fig. 6 is a fragmentary enlarged sectional view through one of the connections for an adjacent screw shaft.

Fig. 7 is a detail perspective view, enlarged, of the shifting lever employed.

Figure 1:
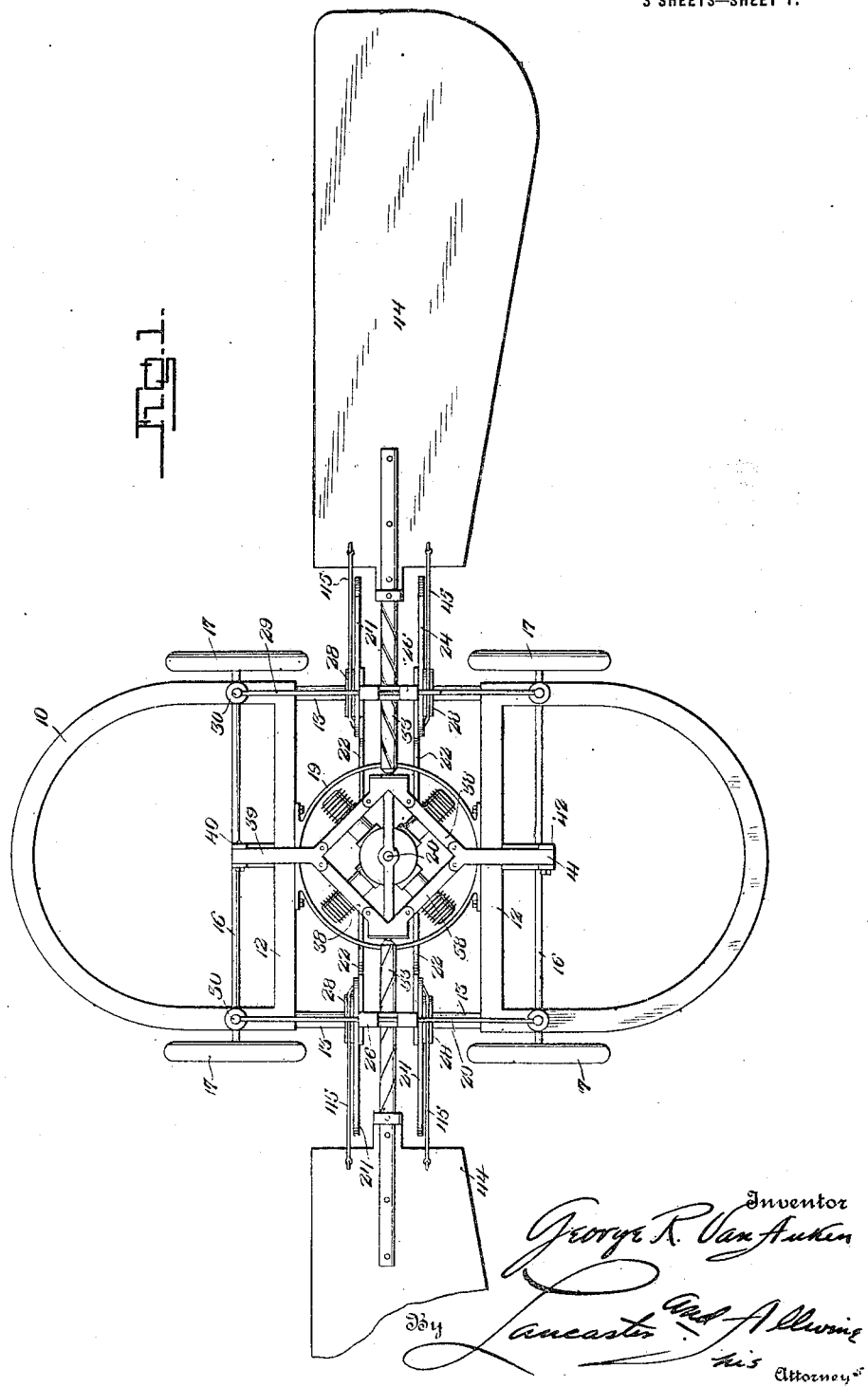
Figure 1 is a top plan view of a device constructed according to the present invention, one of the wings being broken away.

Referring to these drawings, by numerals, 10 and 11 designate a pair of opposite end frame sections provided with cross bars 12 at their inner spaced ends and connected together at opposite sides by guide bars 13 which are preferably cylindrical in cross section.

The frame thus formed may be supported upon a landing or running gear, such as shown particularly in Fig. 4. The landing gear comprises four posts 14 provided upon their lower ends with bearings 15 which support transversely extending axles 16 to the opposite ends of which are secured the landing wheels 17 of any approved type. Guide braces 18 connect the front and rear bearings 15 together to hold the same from spreading apart and for reinforcing and strengthening the landing gear.

Mounted in the frame of the apparatus, and extending between the cross bars 12 and secured thereto, is a field frame 19 of an electric motor or the like, having its axis disposed vertically with respect to the frame when lying in a horizontal plane. Supported within this field or casing 19 is an armature whose shaft 20 projects from motor and is provided upon its lower end with an eccentric 21.

The guide bars 13 are provided thereon with a carriage, the same having a pair of longitudinally spaced apart downwardly arched bars 22 spaced apart sufficiently to bear against the diametrically opposed points on the eccentric 21 and adapted to be shifted longitudinally in the frame by the eccentric. The upper ends of the arched bars 22 are apertured to receive the guide rods 13 therethrough, and a spacing sleeve 23 is arranged between the ends of the bars 22 at each side of the machine and is adapted to receive the bars 13 therethrough. Pivotally mounted at each end of each sleeve 23 is an upwardly extending and outwardly curved arcuate arm 24 having a longitudinal slot 25 therein. Each pair of arms 24 engages against the opposite side of a cross head 26. Pins 27 project from the opposite sides of the cross heads 26 and project through the slots 25 of the arcuate arms, and also support peripherally grooved pulleys 28 against the outer sides of the arms. This construction prevails at each side of the machine, and each cross head is supported upon a pair of vertically spaced apart guide rods 29 secured at opposite ends to the upper ends of posts 30 which are slidably mounted at their lower ends in the frame sections 10 and 11 and adapted to move vertically with respect thereto. Springs 31 are interposed between the frame sections 10 and 11 and the lower guide rods 29 for normally urging the posts 30 upward to yieldingly support the cross heads 26. The springs 31 preferably extend about the lower portions of the post 30 for the purpose of holding the springs from lateral displacement. The arcuate arms 24 serve as connections between the shiftable sleeve 23 and the cross heads 26 for moving the same as a unit, the whole comprising the main portion of the carriage of the mechanism. Each cross head 26 is provided with a gimbaled bearing 32, the inner sleeve portion of which has an axial opening to receive an adjacent screw shaft 33 and provided with inwardly extending tongues or projections 34 adapted to enter the spiral groove or way formed exteriorly in the shaft 33. The screw shafts 33 project inwardly through the bearings 32 and are provided on their inner ends with ball heads 35, as shown in Fig. 6, the heads 35 fitting in sockets 36 and held therein by retaining plates 37, forming universal connections between the blocks 36 and the screw shafts 33. The shafts 33 are thus free to turn the blocks 36 on the lateral corners of an expanding and contracting frame, the blocks 36 having links 38 pivotally connected at one end thereto and extending toward the forward and rear ends of the frame. The forward ends of the forward links 38 are pivotally connected to an arm 39 which is secured in the upper end of a fixed bracket 40 carried upon the forward cross bar 12; the forward end of the collapsible frame is thus held relatively stationary with respect to the main frame. The rear ends of the rear links 38 are pivotally connected to a movable arm 41 which is supported upon the upper end of an operating or shifting lever 42 of substantially L-shape, as shown in Fig. 7, the laterally projecting portion of the lever 42 extending inward beneath the main frame and secured by screws 43 or the like to the rear downwardly arched bar 22. The operating lever 42 is thus connected at one end to the carriage, and at its other end to the movable arm 41 which moves the links 38 relatively to each other for drawing the guide blocks 36 toward and from each other. The upper operating frame is thus collapsible and expansible, and is adapted to move the screw shafts 33 toward and from each other simultaneously with the longitudinal shifting of the carriage.

Arranged upon the outer end of each screw shaft 33 is a wing or paddle 44 of suitable length and width, and formed of any suitable material to withstand the relatively light strains to which the paddle is placed. The inner ends of the paddles 44 are connected, at opposite corners, to ports or cables 45 which extend inwardly and pass over the pulleys 28, the cables 45 being carried down within the main frame and secured at their lower ends to the upper extremities of the downwardly arched bars 22. The cables are thus connected, and pass over the pulleys 28 for the purpose of depressing the yieldable cross head supports at opposite sides of the frame when the screw shafts 33 are projected laterally outward. The longitudinal movement of the shafts 33 through the bearings 32 cause the turning of the shafts 33 and the consequent rotation of the wings 44. When the cross heads 26 are raised and lowered, the wings 44 and their shafts 33 are swung about, substantially a horizontal axis on the bearing block 36. The wings thus receive a motion of rotation, a motion of vertical reciprocation, and a motion of longitudinal reciprocation. These combined motions are utilized for the purpose of creating the desired resistance of the wings 44 against the air to impel the main frame and the parts carried thereby in the desired direction. As the arcuate arms 24 are provided with a longitudinal slot 25, the cross head supports are permitted to have free vertical movement under the tension of the cables 45 in one direction and the tension of the springs 31 in the other direction, the pins 27 of the cross heads moving freely in the slots 25. The arms 24 connect the lower portion of the carriage to the upper portion thereof or the cross heads in all relative adjustments of the same.

With the mechanism thus constructed, it is apparent that all of the parts occupy but relatively small space, are centrally located within the main frame, may be operated from a single motor, and produce the three desired movements simultaneously for effecting the required operation of the wings 44 in obtaining the desired results.

I claim:

1. In wing operating mechanism, the combination of a main frame, a longitudinally shiftable carriage arranged in said frame, wing supporting means carried upon the carriage and adapted to move longitudinally therewith, wings carried by said wing supporting means, turning means arranged upon the carriage for said wings to rotate the same during longitudinal shifting, and means on said carriage connected to the wings for reciprocating the same vertically during longitudinal reciprocation and rotary movement.

2. In wing operating mechanism, the combination of a main frame, a longitudinally movable support arranged in the frame, a pair of wings arranged upon the support, means for reciprocating the support to move the wings longitudinally, means connected to the wings for swinging the same vertically, and turning means connected to the wings for rotating the same during longitudinal and vertical movement.

3. In wing operating apparatus, the combination of a main frame, a carriage longitudinally shiftable in the main frame, wings mounted on the carriage, turning means on the carriage connected to the wings, vertically reciprocating means connected to the wings, and an operating device connected to all of said means for longitudinally and vertically reciprocating the wings and rotating the same simultaneously.

4. In wing operating mechanism, the combination of a carriage, means for moving the carriage back and forth in one linear path, wings mounted upon the carriage, means for reciprocating the wings back and forth in a linear path substantially at right angles to the path of movement of the carriage, and means for turning the wings, all of said means being interconnected for co-action simultaneously.

5. In wing operating mechanism, the combination of a frame, a carriage mounted to reciprocate longitudinally in the frame, wings mounted on the carriage, and means connected to the wings and operable upon the movement of the carriage for swinging the wings vertically, and turning means mounted on the carriage and connected to said wings and operable upon the reciprocation of the carriage for simultaneously turning the wings and reciprocating them in horizontal and vertical directions.

6. In wing operating means, the combination with a main frame, a carriage slidably mounted in the frame, a motor carried by the frame and engaging the carriage for reciprocating it longitudinally in the frame, an expanding and contracting frame supported above the main frame, a pair of screw shafts projecting laterally from the lateral portion of the collapsible frame, bearings mounted on the carriage for said shafts and the shafts having screw connections with the bearings for turning the shafts when the latter are moved longitudinally, a connection between the collapsing frame and said carriage for opening and closing the collapsible frame upon the shifting of the carriage for moving said shafts axially toward and from each other, wings mounted on the outer ends of the shafts, and vertically movable supports for said bearings connected to the said shafts and adapted to be depressed thereby when the shafts are moved laterally outward.

7. In wing operating mechanism, the combination of a main frame, a carriage longitudinally shiftable in the main frame, a motor mounted in the main frame, a connection between the motor and the carriage for reciprocating the latter, a fixed collapsible frame supported above the main frame, screw shafts projecting from the sides of the collapsible frame and having bearing in the carriage and adapted to turn therein and move longitudinally, a connection between the collapsible frame and the carriages for opening and closing the collapsible frame upon the reciprocation of the carriage to move said shaft longitudinally, wings mounted on the outer ends of said shafts, and means on the carriage connected to said wings for vibrating the same vertically upon the longitudinal and rotative movement of the shafts.

8. In wing operating means, the combination with a main frame, of a motor in the frame, a carriage arranged for longitudinal movement in the main frame, a collapsible member arranged above the main frame and fixed at one end thereto, a connection between the other end of the collapsible member and said carriage for opening and closing the member by the reciprocation of the carriage, a pair of wings having inwardly extending supports connected to said collapsible member and adapted to be moved toward and from each other by said member, spring supported bearings connected to the carriage and adapted to receive said shafts therethrough, cables fixed at one end to the carriage and at their outer end to the wings and engaging over pulleys on said bearings for depressing the same when the wings are moved laterally outward from each other.

9. In wing operating mechanism, the combination of a main frame, upper and lower guide rods arranged at opposite sides in the frame, yielding supports for the upper guide rods, cross heads on the guide rods at opposite sides of the frame, a lower carriage portion mounted on the lower guide rods and including downwardly arched spaced apart bars extending transversely in the main frame, arms adjustably connecting the lower carriage member to said cross heads, a motor arranged within the main frame and provided with a depending shaft, an eccentric mounted on the lower end of the shaft between said bars of the lower carriage member, said carriage being adapted to be reciprocated by said eccentric by operation of the motor, a collapsible member fixed at one end in spaced relation over the main frame, a pair of screw shafts connected to the sides of said member and having threaded engagement through said cross heads and supported thereby, wings mounted on the outer ends of said shaft, a connection between said collapsible member and said lower carriage member for actuating the collapsible member upon the reciprocation of the carriage, pulleys mounted on the cross heads, cables secured to said lower carriage member at one end and extending upward and laterally over the pulleys and having connection at their opposite ends with said wings, said cables being adapted to be drawn taut upon the spreading of the collapsible member for forcing said cross heads downward and swinging the wings vertically.

GEORGE R. VAN AUKEN.

Copies of this patent may be obtained for five cents each, by addressing the "Commissioner of Patents, Washington, D. C."